April 4, 1944.  LE CONIE STILES  2,345,637
PRODUCTION OF COFFEE CAKES
Original Filed Nov. 10, 1939  3 Sheets-Sheet 1

INVENTOR.
LeConie Stiles
BY
ATTORNEY.

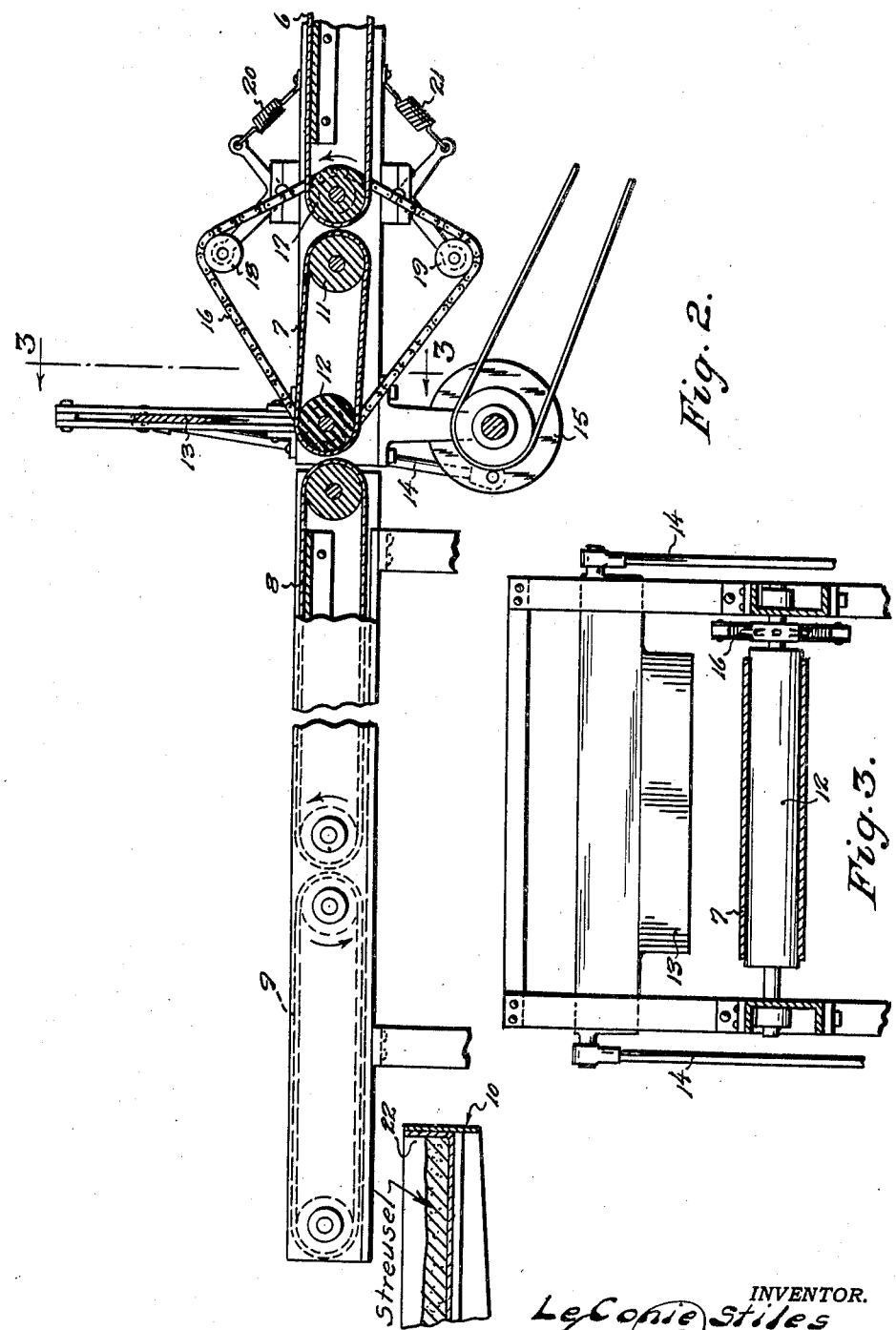

April 4, 1944.  LE CONIE STILES  2,345,637
PRODUCTION OF COFFEE CAKES
Original Filed Nov. 10, 1939   3 Sheets-Sheet 3
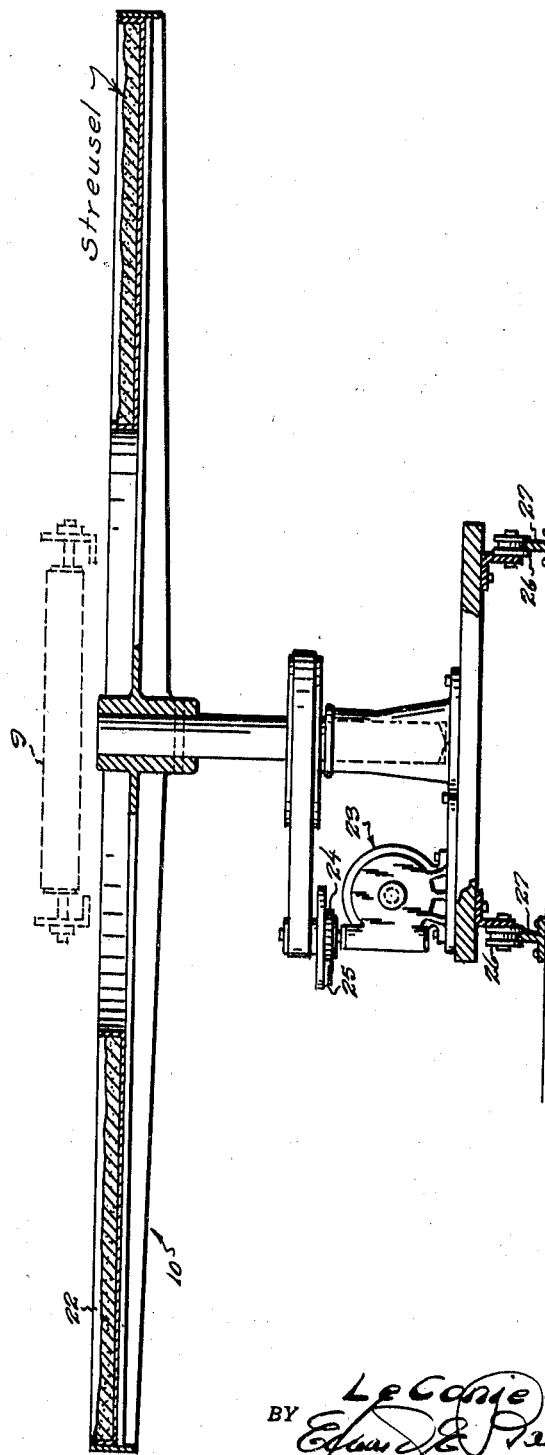
INVENTOR.
Le Conie Stiles
BY
ATTORNEY.

Patented Apr. 4, 1944

2,345,637

UNITED STATES PATENT OFFICE 2,345,637

PRODUCTION OF COFFEE CAKES

Le Conie Stiles, Seattle, Wash.

Substituted for abandoned application Serial No. 303,819, November 10, 1939. This application October 7, 1941, Serial No. 413,961

10 Claims. (Cl. 107—1)

This invention relates to a machine for the production of butter-horns and other like or suitable coffee cakes, and for its object aims to speed production of the cakes and assure a more uniform product than has been possible heretofore.

As a general description of the art of making butter-horns, it may be here stated that the body of dough used for the cakes, following the acts of sheeting a dough layer, sprinkling the same with cinnamon, and turning the dough sheet into an elongated roll, is sliced transversely at spaced intervals of its length. Each of these slices are then flattened against the working table and the operator scatters over the surface a preparation of an icing mixture commonly known in the bakery art as "streusel" and consisting of crushed nuts and powdered sugar. The rolls, so coated, are placed in pans for baking, in the course of which the icing mixture is caused to melt and flow over the roll in a syrupy consistency. My present invention provides mechanical devices comprising a conveyor for the dough sheet and roll, a power-driven slicer driven in timed relation to the conveyor for slicing the roll being conveyed, a second conveyor leading from the slicer and operating to carry the slices, and a rotary "streusel" table having a layer of the "streusel" material thereon disposed to receive the slices discharged from the second-named conveyor and so driven in timed relation to the latter as to enable face-down deposit of the slices in a plurality of radially spaced rows with the successive slices lying in circumferentially spaced relation in each row. By such structure I am permitted to substantially eliminate the greater part of the manual handling, appreciably speed production, and assure uniformity in the product.

The invention consists in the novel method of performing the slicing step and applying "streusel" thereto, and in the advanced construction, adaptation and combination of parts hereinafter described and claimed.

In the drawings:

Fig. 2 is a longitudinal vertical section thereof.

Fig. 3 is a transverse vertical section on line 3—3 of Fig. 2; and

Fig. 4 is a transverse vertical section detailing the "streusel" table.

Figure 1:
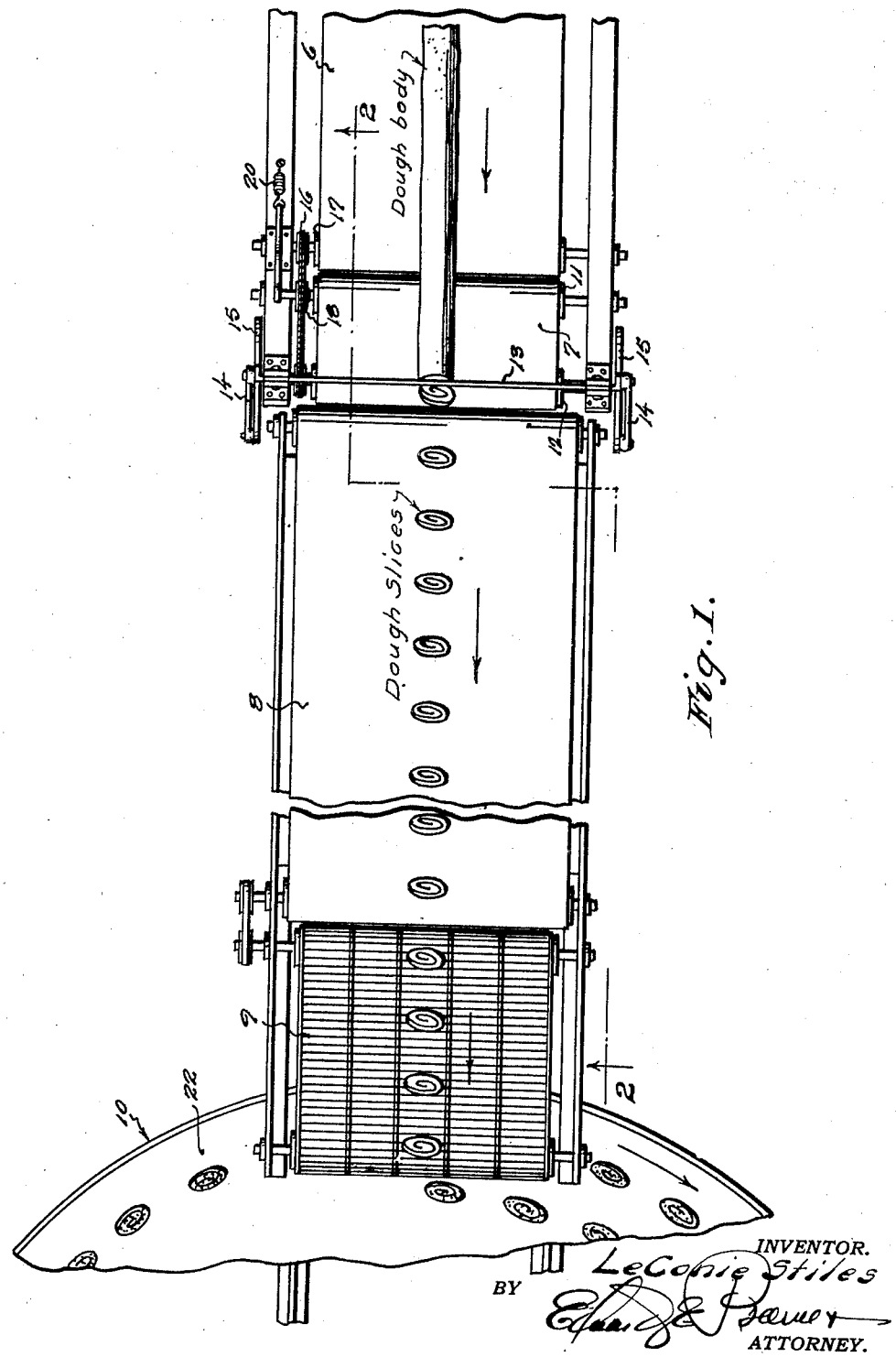
Figure 1 is a plan view illustrating, fragmentarily, a machine constructed in accordance with the now preferred embodiment of the invention and, for simplicity in this, as well as the other views, deleting the driving belts and pulleys from the several supporting rolls of the conveyors.

Referring to said drawings the numerals 6, 7, 8 and 9 denote four endless belts which I will hereinafter refer to as the supply, cutting, inspection, and tail belts, respectively. The function of the supply belt is to convey the work—comprised of a rolled body of cinnamon-coated sheeted dough—to the cutting belt on which, as implied by its named, the dough body is sliced transversely at uniformly spaced intervals. The slicing is performed at the discharge end of the cutting belt, wherefrom the slices drop onto the inspection belt and are in turn discharged to the tail belt which serves to deposit the same into the "streusel" material provided on the "streusel" table, said table being indicated generally by 10. The tail-belt is of open-work wire construction and permits certain types of coffee cakes such, for example, as "bear claws" to be carried by the belts to the table 10 and, preliminary to their delivery—which is to say coincident with their travel upon the tail belt—moistened by a spray nozzle. Where moistening is unnecessary as, for example, in the production of butter-horns wherein the slicing leaves a moist surface, the tail belt may be dispensed with and the work discharged directly from the inspection belt to the "streusel" table. In driving the several belts whose directional course is indicated by arrows, chains or their equivalent in transfer mechanism extend from a common source of power to sprocket wheels fixedly associated with one of the belt rollers of each of the supply, inspection and tail belts. Also employed in the drive assembly is a chain leading from the supply belt to the cutting belt for operating the latter, such latter chain being characterized in that it compensate periodic interruptions in the travel of the cutting belt. A detailed description of such periodic interruptions, and the structure which I provide to compensate therefor, will be given hereinafter. Relative to the driving assembly, it is also here pointed out in the instance of butter-horn production, wherein the dough slices have a width appreciably exceeding their thickness, that the travel of the inspection belt exceeds to a corresponding or greater degree the speed of travel of the supply and cutting belts.

The salient feature of my cutting belt which I support by rollers 11 and 12 is the mode of cutting the work thereon, such cutting being performed by a knife 13 having reciprocatory movement in a vertical plane traversing the roller 12. This roller is or may be composed of a relatively soft rubber permitting a slight cushioning of the knife thrust as the same is carried in its down travel into contacting engagement with the belt 7. The drive to such knife is comprised of connecting rods 14 crank-operated from driving wheels 15, and while the involved mechanics are well known and need no illustration for a clear understanding it is pointed out that the machine employs means for regulating the travel of the knife in relation to the speed of the belt 6 for governing the thickness of the sliced work.

Describing said cutting belt in still further particularity, it is believed to be apparent that its progressive travel is momentarily stopped upon a contact of the knife therewith, and to compensate for this interruptive action I employ a drive consisting of a chain 16 driving the roller 12 and driven from the roller 17 of the supply belt 6 and, above and below the plane of the belt, carrying over floating sprocket wheels 18—19, respectively, which are urged directively from one another through the instrumentality of springs 20—21, the operation being one in which the two sprocket wheels, as the knife interrupts the belt travel, are caused to deflect upwardly in unison with a resulting free travel of the chain with the driving roller. As the knife clears the belt to release the latter upon its upward movement, the two springs by their balancing action return the floating sprocket wheels to normal position and by the accelerated travel of the chain about the wheel which drives the cutting belt take up the lost travel of the latter.

Referring now to the "streusel" table to which the dough slices are deposited from the discharge end of the tail belt 9 and which lies in spaced relation below the latter, I produce the same to a circular form and on its upper side provide a relatively wide annular canal 22 into which the "streusel" mixture is placed, the table being driven by an electric motor 23 through suitable reduction gearing and being so located, for revoluble movement about a vertical axis, as to have the canal in constant register with the discharge end of the tail belt. In the driving gear train is a ratchet arrangement comprising a wheel 24 and a complementing spring-pressed pawl 25 which permits the pan (the "streusel" table) to be manually spun at a speed exceeding the normal motor drive whereby to effect a distribution of the "streusel" preliminary to a run period by the expedient of holding a levelling rake or the like within the canal co-incident with a rapid spinning of the table.

In the motor-driven operation of the table, it is believed to be clear that the successively delivered dough slices lie in circumferentially spaced relation and, upon passing the operators, are removed and, turned upside-down, are placed in pans for baking with the "streusel" which adhered to the underside of the slices in their travel with the rotary table being disposed uppermost. It is desirable that the table be of relatively large diameter accommodating an appreciable number of the slices on a single concentric line, and while an operative assembly might employ a non-shiftable table restricting the deposited slices to this single line it is desirable that plural radially spaced lines be permitted and to this end I mount the table on wheels 26 tracking on rails 27 to enable the table to be shifted longitudinally in relation to the conveyor line. This shifting may be easily performed by one of the operators immediately prior to the completion of each revolution of the table or, if desired, automatic mechanism may be employed. A simple assembly for this purpose consists of a table which is spring-urged in one direction of its longitudinal travel and successively engages a series of stationary stops spaced at intervals corresponding to the spacing of the concentric lines of slices, the release of the table from these successive stops being accomplished by a tripping finger revolving in unison with the table, the tripping function being much in the manner of the tabulating lever of an ordinary typewriter.

The machine and the manner of its employment is believed clear from the foregoing. I intend to imply no limitations excepting as the same are necessarily brought into the hereto annexed claims to distinguish from such practices as may have been previously resorted to in the art.

What I claim, is:

1. A machine for producing coffee cakes comprising, in combination: a "streusel" table supported for revoluble movement about a vertical axis and provided with a relatively flat facing surface uninterrupted circumferentially and functioning to receive a relatively dry "streusel" mixture; means for revolving said table at a relatively slow rim speed; a conveyor belt discharging above the table in off-set relation to the axis of revolution of the latter and acting as a carrier for an elongated rolled body of sheeted dough; and means for slicing the dough body transversely at spaced intervals of its length concurrently with its travel upon the conveyor belt and in advance of the delivery of the work from the discharge end of the belt.

2. A machine according to claim 1, said conveyor comprising separate belts for the elongated dough body and for the work slices disposed in feeding relation, one to the other, and characterized in that the travelling speed of the latter belt exceeds the travelling speed of the former belt to accommodate work slices which are cut to a thickness less than the width of the dough body.

3. In a machine for the production of coffee cakes: a table revoluble about a vertical axis and having in its upper surface an annular channel disposed concentric to the axis of revolution of the table and functioning to receive a relatively dry "streusel" mixture; means for revolving said table at a relatively slow rim speed; a conveyor belt having a travelling speed somewhat in correspondence with the rim speed of the table leading to the latter with its discharge end disposed in elevated relation above the channel; and means for delivering the cakes in a dough stage to the conveyor belt for delivery of the same from said discharge end onto the "streusel" mixture of the channel to lie in circumferentially spaced relation within the latter.

4. A machine according to claim 3 wherein said means for revolving the table includes a ratchet permitting the table to be manually spun at a revoluble speed exceeding the normal driving speed of the table.

5. A machine according to claim 3 having means permitting the table to be shifted such that the point of the work feed is moved radially in relation to the axis of revolution of the table.

6. In a machine for the production of coffee cakes: the combination of complementary endless conveyor belts of which one is continuously driven, and functions to convey an elongated dough body longitudinally thereof and feed the same to the other belt; a slicing knife arranged for reciprocatory vertical movement above the latter of said belts and at the lower extreme of its reciprocatory movement contacting the belt; and means driven from said first-named belt and in turn driving the second-named belt and functioning, upon contact of the knife with the latter belt, to permit momentary interruption in the travel of said second-named belt without affecting continued travel of the first-named belt.

7. In a machine for the production of coffee cakes: the combination of complementary endless conveyor belts of which one is continuously driven, and functions to convey an elongated dough body longitudinally thereof and feed the same to the other belt; a slicing knife operating to slice the work concurrently with its travel upon the latter of said belts and characterized in that the slicing office operates to momentarily interrupt travel of said second-named belt; and means driven from said first-named belt and in turn driving the second-named belt and functioning, without affecting continued travel of the first-named belt, to permit said momentary interruption in the travel of the second-named belt.

8. In a machine for the production of coffee cakes: the combination of a conveyor belt functioning to convey an elongated dough body longitudinally thereof; a source of constant-drive power; a slicing knife operating to slice the work concurrently with its travel upon the belt and characterized in that the slicing office operates to momentarily interrupt the travel of said belt; and belt-driving means driven from said constant-drive power source functioning to permit said momentary interruption in the travel of the belt without affecting the constant drive of the power source.

9. A machine according to claim 8 characterized in that the belt-driving means operates to pick up the lost motion upon a release of the momentarily interrupted belt.

10. In a machine for the production of coffee cakes: a table revoluble about a vertical axis and having in its facing surface an annular channel disposed concentric to the axis of revolution of the table and functioning to receive a relatively dry "streusel" mixture; means for revolving the table at a relatively slow rim speed; and relatively fixed feed devices disposed to lie in elevated relation above the channel and functioning to discharge work slices at timed intervals onto the "streusel" mixture to have the latter adhere to the underside of the slices.

LE CONIE STILES.